(12) United States Patent
Canu et al.

(10) Patent No.: US 9,146,101 B2
(45) Date of Patent: Sep. 29, 2015

(54) DEVICE AND METHOD FOR DETERMINING THE POSITION OF TWO COUPLED SHAFTS WITH RESPECT TO EACH OTHER

(71) Applicant: Pruftechnik Dieter Busch AG, Ismaning (DE)

(72) Inventors: Gianluca Canu, Munich (DE); Bernhard Glaser, Ismaning (DE); Volker Konetschny, Munich (DE); Martin Wegener, Kirchheim (DE)

(73) Assignee: PRUFTCHNIK DIETER BUSCH AG, Ismaning (DE)

( * ) Notice: Subject to any disclaimer, the term of this patent is extended or adjusted under 35 U.S.C. 154(b) by 77 days.

(21) Appl. No.: 14/080,230

(22) Filed: Nov. 14, 2013

(65) Prior Publication Data

US 2014/0139823 A1    May 22, 2014

(30) Foreign Application Priority Data

Nov. 19, 2012  (DE) .......................... 10 2012 022 487

(51) Int. Cl.
*G01N 21/00*  (2006.01)
*G01B 21/16*  (2006.01)
*G01B 11/27*  (2006.01)

(52) U.S. Cl.
CPC .............. *G01B 21/16* (2013.01); *G01B 11/272* (2013.01)

(58) Field of Classification Search
CPC ...................................................... G01B 21/16
USPC ........................................................... 356/72
See application file for complete search history.

(56) References Cited

U.S. PATENT DOCUMENTS

| | | | | |
|---|---|---|---|---|
| 4,518,855 A * | 5/1985 | Malak | ........................ | 356/141.3 |
| 4,698,491 A * | 10/1987 | Lysen | ........................ | 356/152.3 |
| 4,709,485 A * | 12/1987 | Bowman | ........................ | 33/228 |
| 4,864,148 A * | 9/1989 | Lysen et al. | ................ | 250/559.3 |
| 5,026,998 A * | 6/1991 | Holzl | ........................ | 250/559.37 |
| 5,896,672 A * | 4/1999 | Harris | ........................ | 33/645 |
| 5,980,094 A * | 11/1999 | Nower | ........................ | 700/279 |
| 6,040,903 A * | 3/2000 | Lysen et al. | ................... | 356/153 |
| 6,046,799 A * | 4/2000 | Lysen | ........................ | 356/139.1 |
| 6,049,378 A * | 4/2000 | Busch et al. | .................. | 356/138 |
| 6,434,849 B1 * | 8/2002 | Hermann | ........................ | 33/529 |
| 6,873,931 B1 * | 3/2005 | Nower et al. | ................. | 702/151 |
| 7,242,465 B2 * | 7/2007 | Lacko et al. | .................. | 356/153 |
| 7,301,616 B2 * | 11/2007 | Foley | ........................ | 356/141.3 |

(Continued)

FOREIGN PATENT DOCUMENTS

| | | | |
|---|---|---|---|
| DE | 19735975 A1 | 3/1999 |
| DE | 19900737 A1 | 7/2000 |

(Continued)

*Primary Examiner* — Roy M Punnoose
(74) *Attorney, Agent, or Firm* — Barlow, Josephs & Holmes, Ltd.

(57) ABSTRACT

The invention relates to a device for determining the position of a first shaft (10) and of a second shaft (12) that is joined to the first shaft by means of a coupling (14), with respect to each other, having a first measurement unit being placed on a circumferential surface of the first shaft and a second measurement unit being placed on a circumferential surface of the second shaft, wherein at least one of the two measurement units has means (20) for producing at least one light beam bundle (22) and at least one of the two measurement units has detection means (24, 25, 26) in order to detect the impingement position of the light beam bundle on at least one detection area (24, 25, 26).

31 Claims, 7 Drawing Sheets

(56) References Cited

U.S. PATENT DOCUMENTS

| | | | |
|---|---|---|---|
| 8,037,615 B2 * | 10/2011 | Glaser | 33/286 |
| 8,275,192 B2 * | 9/2012 | Ktami et al. | 382/152 |
| 8,533,965 B2 * | 9/2013 | Stromberg | 33/412 |
| 8,607,635 B2 * | 12/2013 | Busch et al. | 73/655 |
| 8,904,658 B2 * | 12/2014 | Lenz | 33/286 |
| 2010/0171488 A1 * | 7/2010 | Wipenmyr et al. | 324/202 |
| 2013/0111768 A1 * | 5/2013 | Lenz | 33/228 |

FOREIGN PATENT DOCUMENTS

| | | |
|---|---|---|
| DE | 10313040 A1 | 10/2003 |
| DE | 10242852 A1 | 3/2004 |
| EP | 0896203 A2 | 2/1999 |

* cited by examiner

DEVICE AND METHOD FOR DETERMINING THE POSITION OF TWO COUPLED SHAFTS WITH RESPECT TO EACH OTHER

BACKGROUND OF THE INVENTION

The invention relates to a device and a method for determining the position of a first shaft and of a second shaft that is joined to the first shaft by means of a coupling, with respect to each other, having a first measurement unit being placed on a circumferential surface of the first shaft and a second measurement unit being placed on a circumferential surface of the second shaft. At least one of the two measurement units has means for producing at least one light beam bundle, and at least one of the two measurement units has detection means for detecting data relating to the impingement position of the light beam bundle on at least one detection area. Furthermore, at least one of the two measurement units is provided with at least one sensor for detecting the angle of rotation of the shaft. The parallel offset as well as the horizontal or vertical angular offset of the two shafts can be determined from the impingement positions of the light beam bundle determined in a plurality of measured positions, that is, in a plurality of angle-of-rotation positions, this being performed typically by curve fitting.

An overview of such shaft alignment measurement devices may be found in U.S. Pat. No. 6,434,849 B1, for example, with a data analysis by means of curve fitting to an ellipse also being described.

Described in DE 33 20 163 A1 and DE 39 11 307 A1 are shaft alignment measurement devices in which the first measurement unit emits a light beam, which is reflected back by a mirror prism of the second measurement unit onto a biaxial optical detector of the first measurement unit.

Known from DE 38 14 466 A1 is a shaft alignment measurement device in which the first measurement unit emits a light beam, which impinges on two biaxial optical detectors of the second measurement unit that are arranged in optical succession in the axial direction.

Described in DE 33 35 336 A1 is a shaft alignment measurement device in which both the first and the second measurement unit each emit a light beam and have a biaxial optical detector, with the light beam being directed in each case onto the detector of the other measurement unit. A shaft alignment measurement device operating according to this principle is also described in U.S. Pat. No. 6,873,931 B1, whereby the two measurement units are each provided with two biaxial acceleration sensors for automatically detecting the angle of rotation of the shaft.

Described in EP 2 093 537 A1 is a measurement device in which the first measurement unit emits a fanned light beam, which impinges on two optical strip detectors of the second measurement unit, these detectors being arranged with a lateral spacing parallel to each other, with the longitudinal direction of the detectors being arranged perpendicular to the fan plane of the light beam; not only the determination of the alignment of the shafts with respect to each other but also the determination of the coupling play is described.

Known from WO 2010/042309 A1 is a shaft alignment measurement device in which each of the two measurement units is provided with a camera arranged in a housing, with the side of the housing facing the other unit being provided with an optical pattern that is recorded by the opposite-lying camera. Here, the side of the housing provided with the pattern is provided with an aperture in each case, through which the opposite-lying pattern is imaged. In an alternative embodiment, one of the two units is provided only with a camera, but not with a pattern, whereas the other unit has no camera, but is provided with a three-dimensional pattern.

Described in EP 1 211 480 A2 is a shaft alignment measurement device in which the first measurement unit is provided with a light source, which directs a light beam onto the second measurement unit provided with a matte screen; the side of the matte screen facing away from the first measurement unit is imaged on an image detector, likewise constituting a part of the second measurement unit, by means of appropriate optics.

Described in U.S. Pat. No. 6,981,333 B2 is how vibrations that occur during measurement are determined by means of gyroscopic sensors when the alignment of shafts is measured, so as to prevent insofar as possible any erroneous readings of the alignment measurement owing to such vibrations.

Described in U.S. Pat. No. 5,980,094 is a shaft alignment measurement method in which, as in DE 33 35 336 A1, the two measurement units direct a light beam onto a biaxial optical detector of the other respective measurement unit, with the radial component of the point of impingement of the light beam being plotted versus the angle of rotation for analysis of the data for each of the two detectors and a sine curve being fitted to the measurement data in each case. In this case, a confidence factor, based on the number of measured points and the angular distribution of the measured points, is determined for the set of data that is being determined and analyzed. It is further proposed in this case to eliminate suspicious data points from the determined set of data either manually or automatically, with a new curve fitting then being performed on the basis of the set of data that has been reduced in this manner and with it being checked whether the confidence factor has increased owing to the reduction in the set of data. However, it is not mentioned how the suspicious data points can be identified, apart from the confidence factor being increased through elimination of these suspicious data points. A similar alignment method is described in U.S. Pat. No. 5,263,261.

SUMMARY OF THE INVENTION

The problem of the present invention is to create a shaft alignment measurement device and a shaft alignment measurement method by means of which an especially simple and reliable measurement is permitted.

This problem is solved in accordance with a device and method according to the present invention.

In the solution according to the invention, it is advantageous to perform a quality rating of the associated data for each individual measured position on the basis of the angular velocity and angular acceleration, the difference between the tangential component of the impingement position and the impingement position of the preceding measured position, in relation to the time interval from the preceding measured position, and the degree of deviation of the impingement position of a curve fitted to at least one part of the determined impingement position; and the data of a measured position are excluded from consideration in determining the shaft offset if the quality rating of these data lies below a threshold value; and reliable measurement data can be determined in a simple manner and eliminated if need be in order to increase the reliability of the determined shaft offset.

Preferred embodiments of the invention are also disclosed herein in connection with the device and method of the present invention.

BRIEF DESCRIPTION OF THE DRAWINGS

Examples of the invention will be described below in connection with the attached drawings wherein.

DETAILED DESCRIPTION OF THE INVENTION

Figure 1:
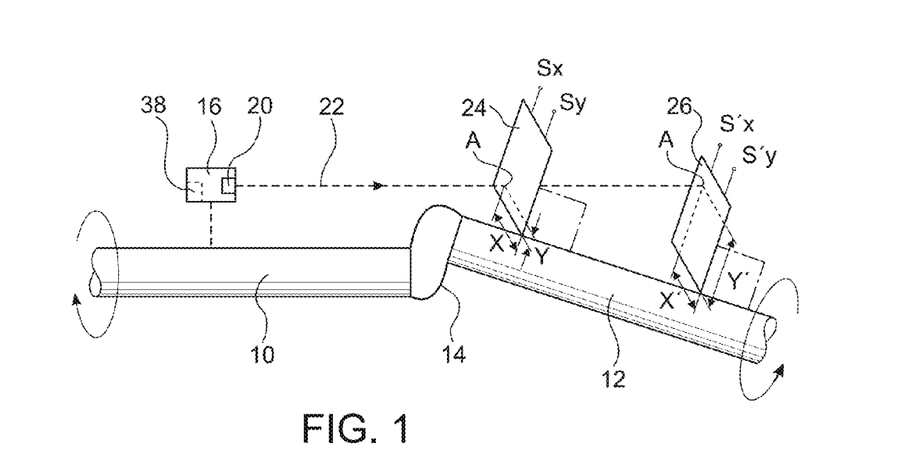
FIG. 1 shows a schematic side view of a shaft alignment device according to the invention in accordance with a first example.

Shown schematically in FIG. 1 is a device by means of which the alignment of a first shaft 10 with respect to a second shaft 12, which is joined to the first shaft by means of a coupling 14, can be determined. The two shafts 10, 12 are arranged in flush succession. The device comprises a first measurement unit 16, which can be attached firmly to a circumferential surface of the first shaft 10, and a second measurement unit 18, which can be attached firmly to a circumferential surface of the second shaft 12. The first measurement unit 16 has a laser light source 20 for producing a light beam or light beam bundle 22, which is directed onto the second measurement unit 18. The second measurement unit 18 has two detection areas 24 and 26, which are arranged in offset succession in the axial direction and each of which typically is formed by a biaxial optical detector. In order to determine the offset of the two shafts 10 and 12 relative to each other, the shafts are rotated together around their axes (with, as a rule, only one of the two shafts being driven); in this process, the impingement positions of the light beam 22 on the two detector areas 24 and 26 are detected in a plurality of measured positions, each of which corresponds to a specific angle-of-rotation position. In the example shown, the radial component is labeled Y or Y' and the tangential component X or X'.

The second measurement unit 18 further has at least one sensor 28, which is suited for detecting the angle of rotation of the second measurement unit 18 — and hence the angle of rotation of the shafts 10 and 12 — as well as the angular velocity and angular acceleration. What is involved here is advantageously at least one biaxial accelerometer or at least one gyroscope, with the sensor being designed advantageously in both cases as a microelectromechanical systems (MEMS) component. A precise determination of the angle of rotation by means of two biaxial accelerometer sensors is described in U.S. Pat. No. 6,873,931 B1, for example. The second measurement unit 18 further has an analysis unit 30, which is supplied with the data of the sensor 28 and the data of the optical sensors 24 and 26 in order to analyze these data and finally determine the shaft offset.

Figure 2:
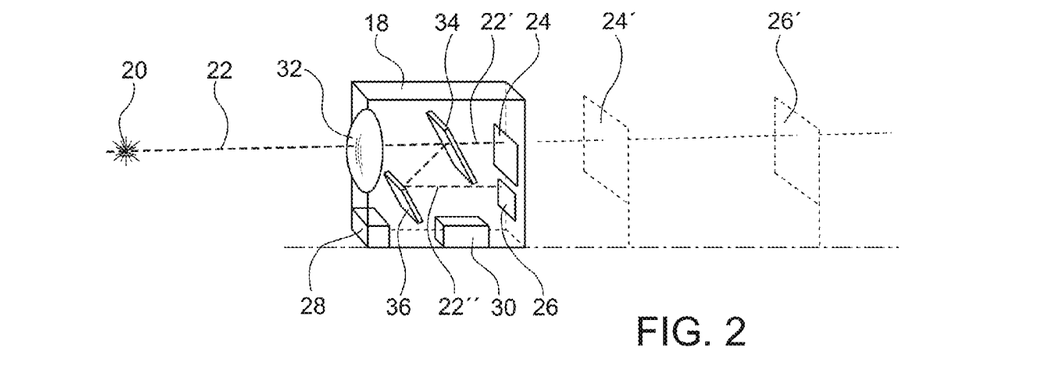
FIG. 2 shows a perspective schematic view of an example of a measurement unit with two optical detectors, which can be used in the device according to FIG. 1.

An example of means by which the detection areas arranged optically in succession can be realized is shown in FIG. 2, this principle being described in detail in DE 38 14 466 A1. In this case, the second measurement unit 18 is provided with a lens 32, a beam splitter 34, and a mirror 36, with the beam 22 entering the lens 32 and striking the beam splitter 34, where one part of the beam 22 is transmitted as beam 22' and impinges on the first detector 24, while one part 22" of the beam 22 is reflected from the beam splitter 34 onto the mirror 36 and, from there, onto the second detector 26. In the example shown in this case, the two detector areas 24 and 26 are spatially offset not axially but radially (or tangentially) with respect to each other, whereas the second detector area 26 is optically (or virtually) arranged axially offset behind the detector area 24 on account of the effect of the beam splitter 34 and the mirror 36 (that is, the points of impingement of the partial beams 22', 22" are such that the two detector areas 24 and 26 are arranged in axial succession).

In order to determine the impingement position of the light beam 22 on the first detector area 24 or the second detector area 26, it is possible to perform a center of gravity calculation in the case when the spot of light extends over a plurality of detector pixels. Such a determination of the impingement position can be implemented either already in the detector itself or else in the analysis unit 30.

Figure 3A:
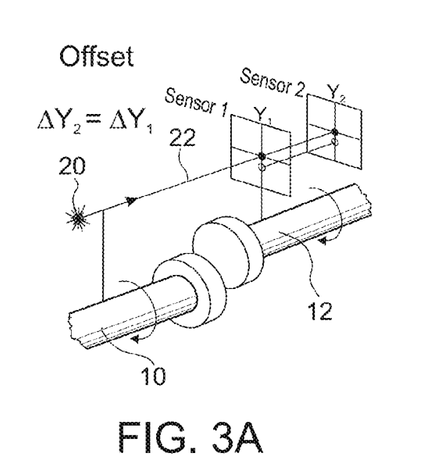
FIGS. 3A and 3B show a schematic illustration of the impingement positions of the light beam in a device according to FIG. 1 for parallel offset or vertical angular offset of the two shafts.
Figure 3B:
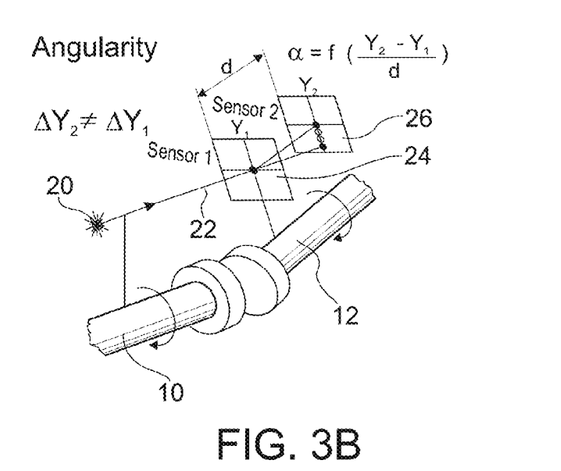

Illustrated schematically in FIGS. 3A and 3B is the effect of a vertical parallel offset or a vertical angular offset of the shafts 10 and 12 with respect to each other in terms of the impingement position on the first detector 24 and the second detector 26, with the migration of the impingement positions during a revolution of the shafts 10, 12 being shown in each case.

Figure 4:
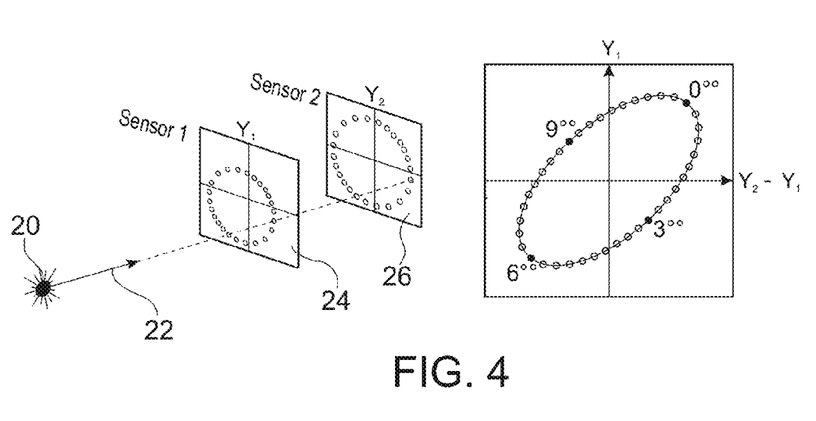
FIG. 4 shows an illustration of the impingement positions of the light beam of the device of FIG. 1 for one complete revolution of the shafts during the measurement for a relatively reliable measurement.
Figure 7:
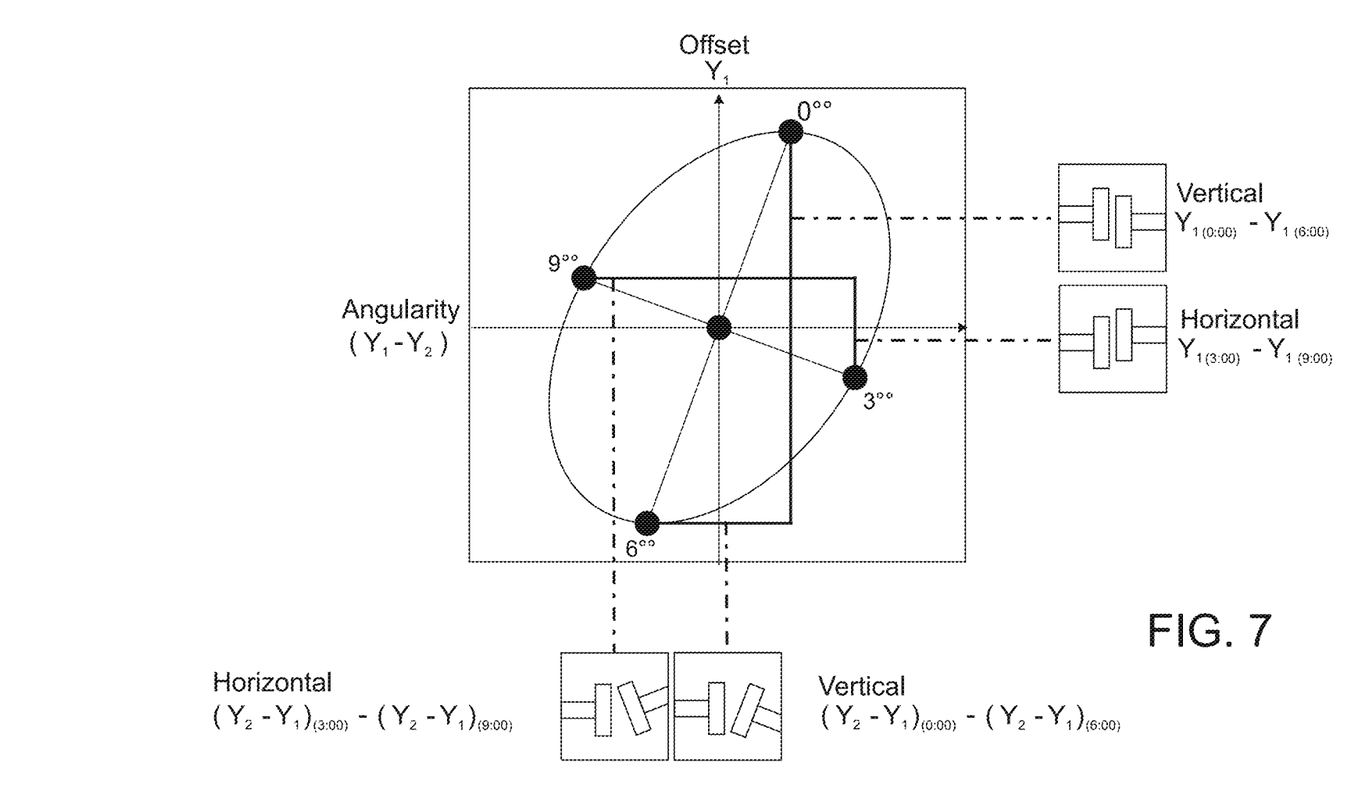
FIG. 7 shows an illustration of the analysis of the curve determined during a measurement in accordance with FIGS. 4 to 6.

Illustrated in FIG. 4 is the migration of the impingement positions during one revolution of a shaft for the general case, that is, when both a parallel offset as well as a vertical and a horizontal angular offset exist. In this case, a circle results on each of the two detector areas. For determination of the shaft offset, the data relating to the impingement positions are usually plotted in such a way that the radial component of the impingement position on the detector area 24 (labeled Y1 in the example) that lies closer to the light source is plotted in one direction, while the difference between the radial components of the impingement positions on the first sensor area 24 and the second sensor area 26 is plotted in the other direction (labeled "Y1-Y2" in the example). In general and in the ideal case, the measured points plotted in this manner lie on an ellipse, which is parametrized with the angle of rotation of the shaft. In the example shown in FIG. 4, the apices of the ellipse correspond in this case to the twelve o'clock, six o'clock, three o'clock, and nine o'clock positions of the measurement units in the course of one revolution of the shafts (in the general case, however, these positions do not coincide with the apices of the ellipse). The parameters of the sought ellipse are usually determined by means of curve fitting to the measured points. The parallel offset, the vertical angular offset, and the horizontal angular offset of the shafts can then be determined from the shape of the ellipse determined in this way, as is indicated in FIG. 7. In this connection, reference is made to DE 39 11 307 A1 by way of example.

In practice, however, the measured points do not lie exactly on an elliptical curve, because various measurement errors can lead to a corresponding deviation. One problem encountered in this connection lies, for example, in the play of coupling 14, which is fundamentally always present to a greater or lesser extent and which leads to the fact that the two shafts 10, 12 are not rigidly coupled during rotation, so that, when the shaft 10 is driven, for example, the shaft 12 rotates not at all or more slowly than the shaft 10 at the start of the rotational movement. This then leads to a displacement of the measurement units 16, 18 in the tangential direction relative to each other, which also influences the radial component of the impingement point of the light beam 22 on the detector areas 24, 26. A strong angular acceleration, for example, can also lead to a tangential displacement between shaft and associated measurement unit as well as to a relative rotation of the two shafts due to the elasticity or inertia of the measurement units 16, 18. A non-optimal, that is, quite rigid, connection between the respective measurement unit and the shaft can also lead to deviations in the impingement positions.

Figure 5:
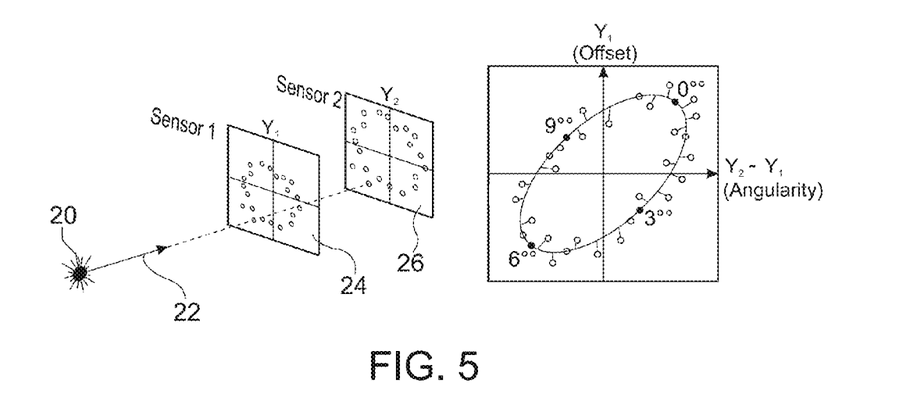
FIG. 5 shows a view similar to FIG. 4, with a less reliable measurement being depicted.

Shown in FIG. 5 is an example of a non-ideal measurement, for which the individual measured points deviate, in part substantially, from the ellipse fitted to the measured points.

As a rule, the greater the standard deviation of the measured points from the fitted ellipse, the more unreliable is the result of the curve fitting—and hence the determination of the shaft offset.

The reliability of the curve fitting can be increased by performing a quality rating of the individual measured points on the basis of certain criteria and not at all taking into consideration measured points with a poor quality rating or taking them into consideration with only a small weighting in the analysis, that is, in the curve fitting. The following criteria can be employed in the quality rating of the individual points (each of which corresponds to a specific measured position): angular velocity and angular acceleration; difference between the tangential component of the impingement position or impingement positions and the tangential component of the impingement position or impingement positions of the preceding measured position, in relation to the time interval from the preceding measured position; degree of deviation of the impingement position or of the measured point of a curve fitted to at least a part of the determined measured points; vibration intensity during the measurement; change in angular acceleration; time interval between the measured position and a reference time point of the rotational movement, with the reference time point corresponding to the start of rotational movement, for example; the sensor 28, provided for detecting the angle of rotation, is designed advantageously for detecting the vibration intensity; in particular, an accelerometer sensor is especially well suited in this case. The greater the vibration intensity of a measured point, the poorer it is rated.

Furthermore, the closer a measured point lies to the start of rotational movement, the poorer it can be rated, because, when the shafts 10, 12 are started up, the play in the coupling, for example, plays an especially large role and, as a result, the measurement results can be correspondingly degraded.

The greater the angular acceleration or the change in the angular acceleration, the poorer is the rating of a measured point, because, at a high acceleration or a strong change in the acceleration, there is an especially great risk of obtaining erroneous measured values due to inertial effects.

A higher angular velocity also leads to a poorer rating of the measured position.

Advantageously, the greater the difference between the tangential component of the impingement position and the tangential component of the impingement position of the preceding measured position, in relation to the time interval from the preceding measured position, the poorer the rating of a measured position, because this is an indication of a different angular velocity of the two shafts at the time of measurement and can strongly degrade the measurement result.

Figure 6:
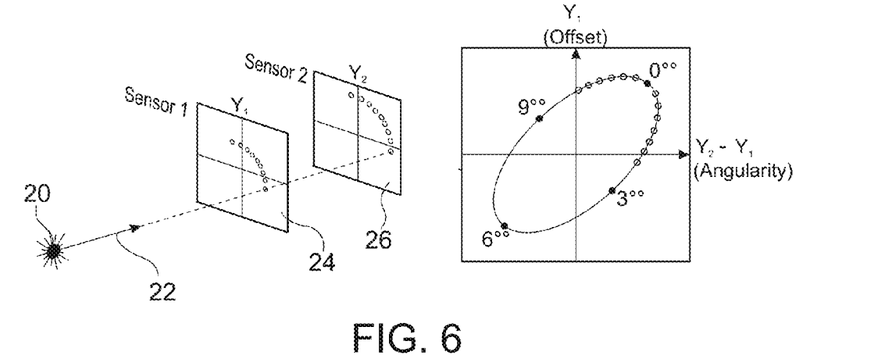
FIG. 6 shows a view similar to FIG. 4, with the measurement being performed only over a part of a complete revolution of the shafts.

Although, as a rule, it will increase the reliability of the shaft offset determination, the measured positions do not fundamentally need to pass through a complete revolution of the shafts 10, 12. Instead, it can also be sufficient to perform measurements only over a partial revolution of the shafts 10, 12, because extrapolation over the remaining angle-of-rotation range, so to speak, is possible by means of curve fitting. An example of this is shown in FIG. 6, where only an angle-of-rotation range of 100° was traversed.

In this case, after traversing a certain number of measured positions, that is, after traversing a certain range of angles, an overall quality rating of the data of the measured positions traversed up to this point can be performed on the basis of the individual measured positions. In doing so, a curve fitting, based on the measured positions traversed up to this point, can also be performed and a message regarding the determined overall quality can be displayed.

For example, the overall quality rating can occur through an appropriate averaging of the individual quality ratings. In this case, a threshold value for the overall quality of the measurement can also be fixed and then, depending on whether the determined overall quality has already reached this threshold value or not, a message that the measurement can be terminated at this time or that the measurement still needs to be continued can be displayed so as to achieve an adequate quality. When, during a measurement over 90°, for example, only relatively poor measured positions are present (for example, on account of a large play in coupling and/or a rotational movement that is too jerky), the analysis unit 30 will decide that the measurement still needs to be continued. If, by contrast, there are already many good measured points, the measurement can be terminated.

In addition to the quality rating of the individual measured positions, the distribution of the measured positions over the angle of rotation and the number of measured positions can also be included in the rating of the overall quality. In doing so, a uniform distribution over the angle of rotation as well as a large number of measured positions lead to a higher quality rating.

The mean deviation of the individual measured points from the fitted curve, that is, the standard deviation of the fitting, can also taken into consideration in determining the overall quality.

Figure 8A:
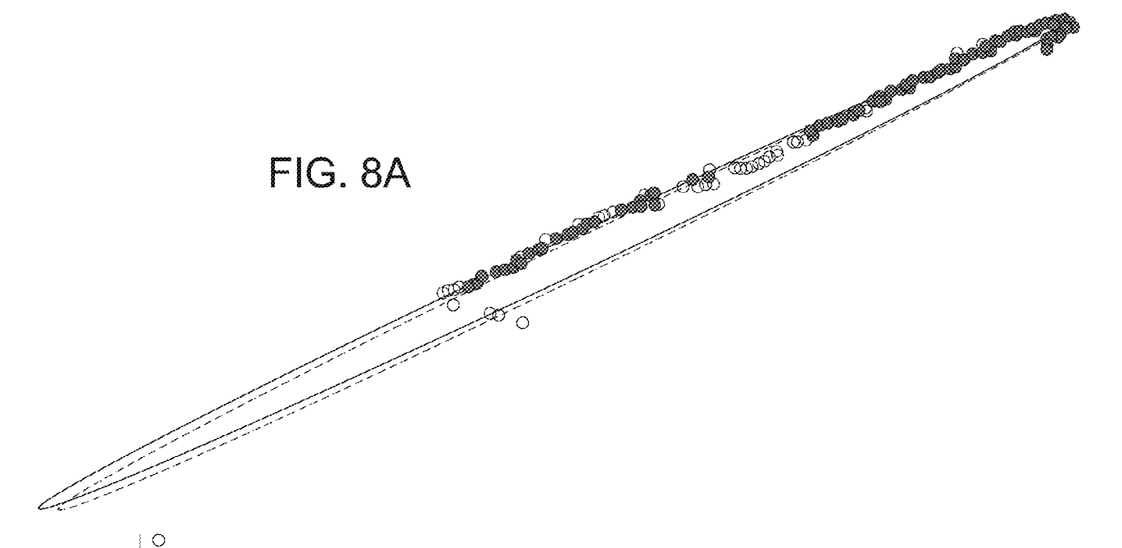
FIGS. 8A and 8B show a practical example of measured points of the kind shown in FIGS. 4 to 7, with the measured points being shown with fitted curve (FIG. 8A); the percent deviation of each measured point from the fitted curve in FIG. 8A is shown as a function of the angle of rotation in FIG. 8B.
Figure 8B:
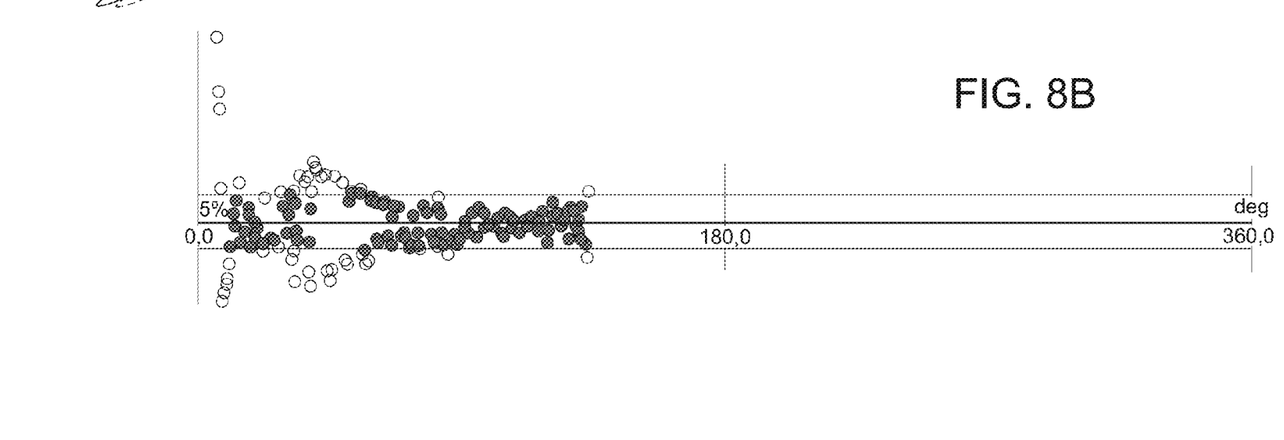

Shown in FIGS. 8A and 8B is another example of a measured value analysis with erroneous measured points, in which, in the traced ellipse, only measured values whose deviation was at most 5% (solid circles) from an ellipse fitted to all measured points were taken into consideration for curve fitting, whereas the measured values with a greater deviation (open circles) were not taken into consideration in the fitting (the ellipse obtained by fitting all measured points is illustrated in FIG. 8A with a broken line).

Figure 9A:
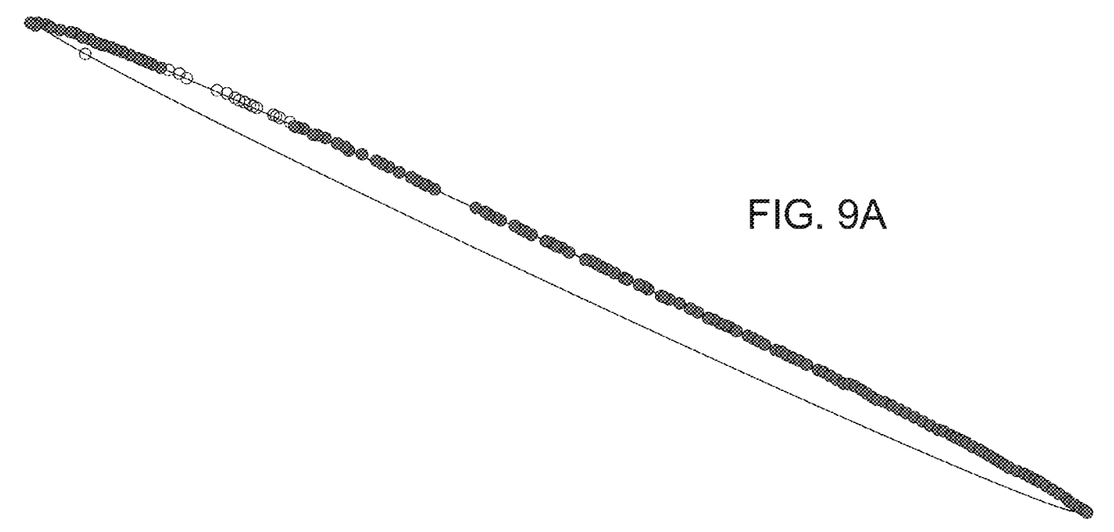
FIGS. 9A and 9B show a view similar to FIG. 8A or 8B, with another example being illustrated.
Figure 9B:
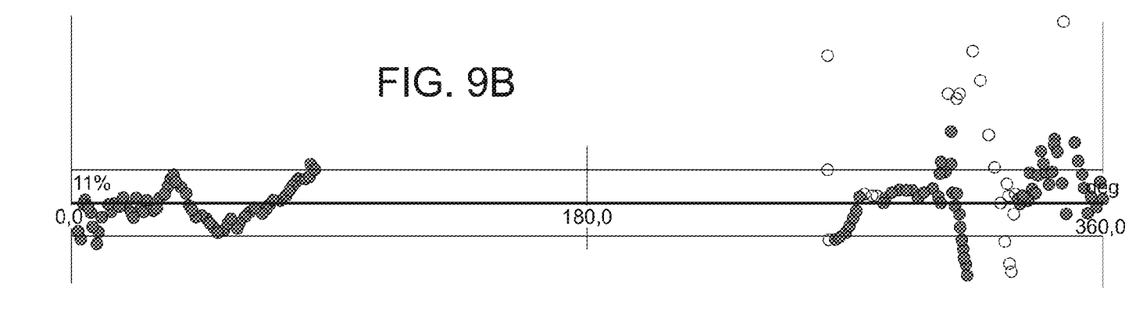

A similar example is shown in FIGS. 9A and 9B.

As already mentioned, the sensor 28 for the angle of rotation can be at least one biaxial accelerometer sensor. However, in order to increase the accuracy of angle detection, two such accelerometer sensors can also be provided.

Whereas, in the hitherto described embodiment example, only the second measurement unit is provided with a sensor for angle-of-rotation determination, two measurement units, each with at least one angle-of-rotation sensor, can also be provided in accordance with an alternative embodiment (such an additional angle-of-rotation sensor of the first measurement unit 16 is indicated by 38 in FIG. 1). In this case, a data link between the first and second measurement unit 16, 18 has to be provided in order for the analysis unit 30 to be able to take into consideration all angle-of-rotation sensors that are present. In doing so, the difference between the angle-of-rotation position determined by means of the first measurement unit 16 and the angle-of-rotation position determined by means of the second measurement unit 18 can then be determined in order to determine from it the coupling play and to take the latter into consideration in the quality rating of the individual measured positions and/or in the overall quality rating.

As already mentioned, the determination of the impingement positions of the light beam bundle 22 can occur in each case by means of a biaxial optical detector. Alternatively, however, it is fundamentally possible to create the detection area, that is, the area on which the light beam bundle impinges, as a scattering area or matte screen, with the detection area then being imaged by a camera, which, in the case of a scattering area, is directed at the side of the scattering area that faces the direction of impingement of the light beam bundle and, in the case of a matte screen, is directed at the side of the matte screen that faces away from the direction of impingement of the light beam bundle. The determination of the impingement position then occurs by means of image processing.

The proposed kind of pre-processing of measured data by means of quality rating of the individual measured positions is also fundamentally applicable to other optical shaft alignment measurement methods.

Figure 10:
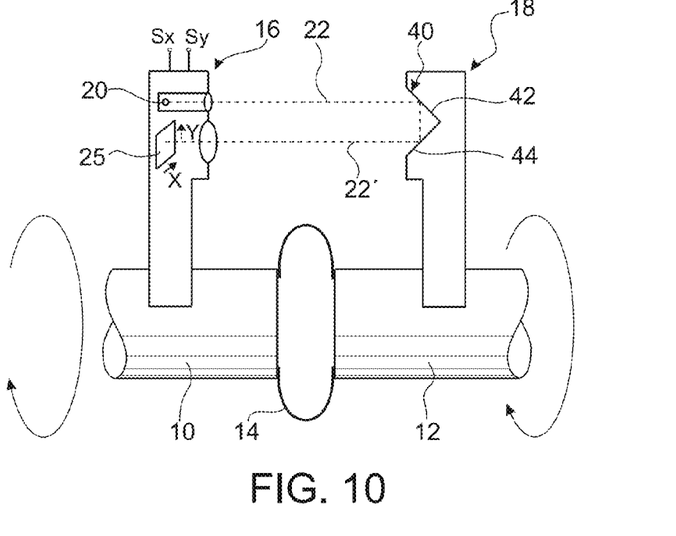
FIG. 10 shows a view similar to FIG. 1, with an alternative measurement method being illustrated schematically.

Shown in FIG. 10, for example, is thus a method in which the measurement unit 18 has both the light source 20 and also a biaxial optical detector 25, whereas the second measurement unit has a reflector arrangement 40 in order to reflect the light beam 22 emitted from the first measurement unit 20 onto the detector area 25. In this case, the radial component Y and the tangential component X of the impingement position of the reflected light beam bundle 22' on the detector area 25 are used for curve fitting, with an ellipse resulting once again.

Typically, the reflector arrangement 40 has two reflecting areas 42 and 44 arranged at a right angle to each other, each of which reflect the impinging beam 22 in succession, so as to deflect it back to the detector area 25; the two areas 42, 44 are arranged at an angle of roughly 45° to the vertical in this case and extend in the tangential direction. The reflector arrangement 40 can be designed in this case, as shown in FIG. 10, as a kind of mirror or it can be designed as a prism, in particular as a Porro prism or as a triple prism. Such a system is described in DE 39 11 307 A1, for example.

Figure 11:
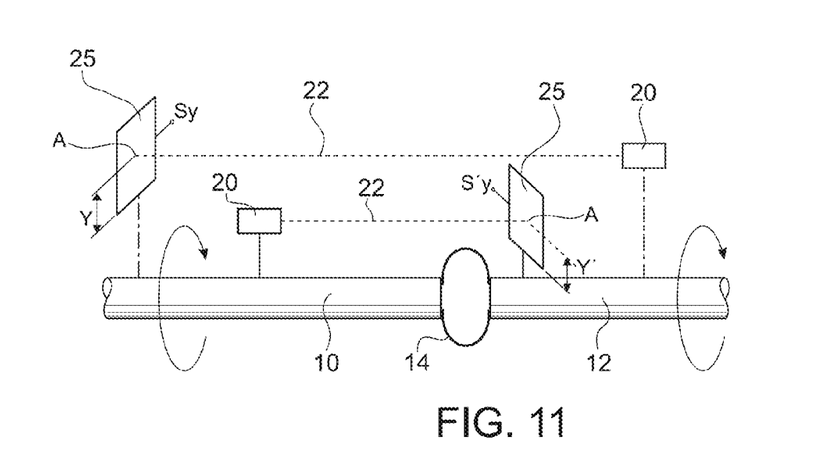
FIG. 11 shows a view similar to FIG. 1, with another alternative measurement method being illustrated schematically.

Another alternative measurement method is shown in FIG. 11, where each of the two measurement units 16, 18 is provided with a respective light source 20 and a respective biaxial optical detector 25. In this case, the light source 20 of the first measurement unit 16 is directed at the detector 25 of the second measurement unit 18 and the light source 20 of the second measurement unit 18 is directed at the detector 25 of the first measurement unit 16. The analysis of the measured points occurs in this case in a similar way to the measurement principle according to FIGS. 1 to 7; that is, the radial component of the impingement point on one of the two detectors is plotted against the difference between the radial components of the impingement points on the two detectors; the points thus plotted are then fitted to an ellipse.

It would be appreciated by those skilled in the art that various changes and modifications can be made to the illustrated embodiments without departing from the spirit of the present invention. All such modifications and changes are intended to be covered by the appended claims.

What is claimed is:

1. A device for determining the position of a first shaft and of a second shaft that is joined to the first shaft by means of a coupling, comprising:
   a first measurement unit being placed on a circumferential surface of the first shaft, a second measurement unit being placed on a circumferential surface of the second shaft, as well as an analysis unit;
   wherein at least one of the two measurement units has means for producing at least one light beam bundle and at least one of the two measurement units has detection means for detecting data relating to the impingement position of the light beam bundle on at least one detection area;
   wherein at least one of the two measurement units comprises at least one biaxial accelerometer sensor or gyroscope sensor for detecting the angle of rotation of the shafts;
   wherein the analysis unit determines respective angle-of-rotation position, angular velocity, and angular acceleration of the shafts in a plurality of measured positions from the sensor data and determines the respective impingement position of the light beam bundle on the at least one detection area from the data supplied by the detection means, and determines the offset of the shafts from at least a part of the determined impingement positions by curve fitting;
   and wherein the analysis unit is configured to perform a quality rating of the associated data for each of the individual measured positions based on at least the following criteria:
      angular velocity and angular acceleration,
      difference between the tangential component of the impingement position(s) and the tangential component of the impingement position(s) of the preceding measured position, in relation to the time interval from the preceding measured position,
      degree of deviation of the impingement position(s) from a curve fitted to at least a part of the determined impingement positions;
   and to exclude data of a measured position from being taken into consideration in determining the shaft offset or to take data into consideration only with reduced weighting if the quality rating of these data lies below a threshold value.

2. The device according to claim 1, wherein the at least one sensor detects vibrations for each measured position, with the respective vibration intensity being a further criterion in evaluating quality of the data, a greater vibration intensity having a lower quality rating compared to a lower vibration intensity.

3. The device according to claim 1, wherein the analysis unit includes the time interval between the measured position and a reference time point of the rotational movement as a further criterion in evaluating quality of the data.

4. The device according to claim 3, wherein the reference time point is the start of the rotational movement, with a greater interval from the start of the rotational movement has a higher quality rating compared to a lesser interval from the start of rotational movement.

5. The device according to claim 1, wherein the analysis unit includes the time change of the angular acceleration as a further criterion in evaluating the quality of the data.

6. The device according to claim 5, wherein a greater time change of the angular acceleration has a lower quality rating compared to a lesser time change of the angular acceleration.

7. The device according to claim 1, wherein a higher angular velocity has a lower quality rating compared to a lower angular velocity.

8. The device according to claim 1, wherein a higher angular acceleration has a lower quality rating compared to a lower angular acceleration.

9. The device according to claim 1, wherein a greater difference between the tangential component of the impingement position and the impingement position of the preceding measured position, in relation to the time interval from the preceding measured position, has a lower quality rating compared to a lesser difference between the tangential component of the impingement position and the impingement position of the preceding measured position.

10. The device according to claim 1, wherein measured positions included in the curve fitting with lesser weighting have a lower quality rating compared to measured positions included in the curve fitting with greater weighting.

11. The device according to claim 1, wherein the analysis unit, after traversing a predetermined number of measured positions, a quality rating of the data of the measured positions traversed is performed on the basis of the quality rating of the individual measured positions to perform a curve fitting based on the measured positions traversed, and to output a message regarding the quality rating that has been determines.

12. The device according to claim 11, wherein the content of the message is either the termination or continuation of the measurement depending on whether the quality rating determined has or has not reached a predetermined threshold value.

13. The device according to claim 11, wherein the analysis unit is configured such that the angle-of-rotation distribution of the measured positions and the number of measured positions are used for determining the quality rating.

14. The device according to claim 11, wherein the mean deviation of the impingement positions from the fitted curve is used for determining the quality rating.

15. The device according to claim 1, wherein at least one of the two measurement units comprises two accelerometer sensors.

16. The device according to claim 1, wherein at least one sensor is an accelerometer sensor configured and arranged as a microeltectromechanical systems component.

17. The device according to claim 1, wherein each of the two measurement units is provided with at least one of the sensors, with the analysis unit determining the coupling play from the difference between the angle-of-rotation position determined with the data of the at least one sensor of the first measurement unit and the angle-of-rotation position determined with the data of the at least one sensor of the second measurement unit and to take this difference into consideration when determining the quality rating.

18. The device according to claim 1, wherein the detection means is at least one biaxial optical detector.

19. The device according to claim 1, wherein the detection area is a scattering area and the detection means is a camera, the camera capturing images of a side of the scattering area facing a side of impingement of the light beam bundle.

20. The device according to claim 1, wherein the detection area is a matte screen and the detection means is a camera, the camera capturing images of a side of the matte screen facing away from a side of impingement of the light beam bundle.

21. The device according to claim 1, wherein the first measurement unit includes means for producing the at least one light beam bundle and the second measurement unit includes detection means, the detection means having a first and a second detection area, the second detection area being optically offset in the axial direction in relation to the first detection area, and the two detection areas being impinged simultaneously by at least a part of the light beam bundle.

22. The device according to claim 21, further comprising:
a beam splitter connected upstream to the first detection area to direct a part of the light beam bundle onto the second detection area.

23. The device according to claim 21, wherein the radial component of the respective impingement position on each of the two detection areas is employed for the curve fitting.

24. The device according to claim 23, wherein the radial component of the impingement position on the first detection area and the difference between the radial components of the impingement positions on the first and the second detection areas are employed for the curve fitting.

25. The device according to claim 1, wherein the first measurement unit includes means for producing the at least one light beam bundle and the detection means, with the second measurement unit having a reflector arrangement, which faces the first measurement unit when the measurement units are placed on the respective shaft to reflect the light beam bundle onto the detection area.

26. The device according to claim 25, wherein the radial component and the tangential component of the impingement position on the detection area are employed for the curve fitting.

27. The device according to claim 25, wherein the reflector arrangement is configured as a prism selected from the group consisting of a Porro prism and a triple prism.

28. The device according to claim 23, wherein the curve fitting is to an ellipse.

29. The device according to claim 24, wherein the curve fitting is to an ellipse.

30. The device according to claim 26, wherein the curve fitting is to an ellipse.

31. A method for determining the position of a first shaft and of a second shaft that is joined to the first shaft by means of a coupling, comprising the steps of:
placing a first measurement unit on a circumferential surface of the first shaft;
placing a second measurement unit on a circumferential surface of the second shaft;
producing at least one light beam bundle by at least one of the two measurement units and directing the at least one light beam bundle onto at one least one detection area on at least one of the two measurement units,
detecting data relating to the impingement position of the light beam bundle on the at least one detection area in a plurality of measured positions and detecting data relating to an angle of rotation of the shafts by at least one of the two measurement units by means of at least one sensor, which includes at least one biaxial accelerometer or one gyroscope;
wherein the respective angle-of-rotation position, angular velocity, and angular acceleration of the shafts are determined from data from the sensors and the respective impingement position of the light beam bundle on the at least one detection area is determined from the impingement position data, and offset of the shafts is determined from at least a part of the determined impingement positions by curve fitting;

performing a quality rating of the associated data for each of the individual measured positions based on at least the following criteria:

angular velocity and angular acceleration, difference between the tangential component of the impingement position and the tangential component of the impingement position of a preceding measured position, in relation to the time interval from the preceding measured position, degree of deviation of the impingement position(s) from a curve fitted to at least a part of the determined impingement positions; and excluding data of a measured position from consideration in determining the shaft offset or are considered only with reduced weighting if the quality rating of the data lies below a threshold value.

* * * * *